US010644399B2

United States Patent
Kim

(10) Patent No.: US 10,644,399 B2
(45) Date of Patent: May 5, 2020

(54) VEHICLE AND METHOD FOR CONTROLLING THE SAME

(71) Applicant: Hyundai Motor Company, Seoul (KR)

(72) Inventor: Sung Un Kim, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 81 days.

(21) Appl. No.: 15/073,308

(22) Filed: Mar. 17, 2016

(65) Prior Publication Data

US 2016/0278153 A1    Sep. 22, 2016

(30) Foreign Application Priority Data

Mar. 19, 2015  (KR) .................. 10-2015-0038430

(51) Int. Cl.
| *H01Q 3/34* | (2006.01) |
| *H04W 4/02* | (2018.01) |
| *H04B 7/06* | (2006.01) |
| *H04W 84/18* | (2009.01) |
| *H04W 4/029* | (2018.01) |

(52) U.S. Cl.
CPC ............ *H01Q 3/34* (2013.01); *H04B 7/0617* (2013.01); *H04W 4/023* (2013.01); *H04W 4/029* (2018.02); *H04W 84/18* (2013.01)

(58) Field of Classification Search
CPC ....... H04W 76/02; H04W 4/02; H04W 84/18; H01Q 3/03
See application file for complete search history.

(56) References Cited

U.S. PATENT DOCUMENTS

| 5,462,122 | A  | * | 10/1995 | Yamamoto | ............. E02F 3/842 |
|           |    |   |         |          | 172/2 |
| 6,252,520 | B1 | * | 6/2001  | Asami    | .................. B60W 40/04 |
|           |    |   |         |          | 340/435 |
| 9,153,077 | B2 | * | 10/2015 | Healey   | ..................... G07C 5/00 |
| 9,678,341 | B2 | * | 6/2017  | Kim      | .................. G02B 27/0101 |
| 2003/0234126 | A1 | * | 12/2003 | Schmitt | ................. B60K 28/16 |
|           |    |   |         |          | 180/170 |
| 2007/0195808 | A1 | * | 8/2007  | Ehrlich | ................... H04L 45/04 |
|           |    |   |         |          | 370/408 |
| 2010/0123395 | A1 | * | 5/2010  | Ahn     | ....................... B60Q 1/143 |
|           |    |   |         |          | 315/82 |
| 2012/0062391 | A1 | * | 3/2012  | Pan     | ....................... B60Q 5/008 |
|           |    |   |         |          | 340/901 |
| 2013/0103781 | A1 | * | 4/2013  | Mori    | ..................... H04L 1/0084 |
|           |    |   |         |          | 709/213 |

(Continued)

FOREIGN PATENT DOCUMENTS

| JP | 2008225583 A  | 9/2008 |
| JP | 2009-187413 A | 8/2009 |

(Continued)

*Primary Examiner* — Xavier S Wong
(74) *Attorney, Agent, or Firm* — Mintz Levin Cohn Ferris Glovsky and Popeo, P.C.; Peter F. Corless

(57) ABSTRACT

A vehicle includes: a wireless communication device transmitting a radio signal into a surrounding area of the vehicle through beamforming and receiving sensor information, in return, from at least one other vehicle that receives the radio signal; a generator generating surrounding condition information regarding the surrounding area of the vehicle based on the received sensor information; and an indicator indicating the surrounding condition information.

12 Claims, 19 Drawing Sheets

(56) References Cited

U.S. PATENT DOCUMENTS

| | | | | |
|---|---|---|---|---|
| 2013/0155534 A1* | 6/2013 | Sala | .......................... | B60R 1/00 |
| | | | | 359/843 |
| 2014/0129083 A1* | 5/2014 | O'Connor Gibson | ....................... | |
| | | | | B60G 99/00 |
| | | | | 701/37 |
| 2014/0129129 A1* | 5/2014 | Prokhorov | .......... | B60R 21/0134 |
| | | | | 701/301 |
| 2014/0176360 A1* | 6/2014 | Lehning | ................ | G01S 13/867 |
| | | | | 342/66 |
| 2015/0039218 A1* | 2/2015 | Bowers | ............. | B60W 30/0956 |
| | | | | 701/301 |
| 2017/0041974 A1* | 2/2017 | Liao | ..................... | H04W 8/005 |

FOREIGN PATENT DOCUMENTS

| | | |
|---|---|---|
| JP | 2011-204151 A | 10/2011 |
| JP | 2012164327 A | 8/2012 |
| JP | 2014-169922 A | 9/2014 |
| JP | 2015103100 A | 6/2015 |
| KR | 10-2007-0110721 A | 11/2007 |
| KR | 10-2014-0061179 A | 5/2014 |

* cited by examiner

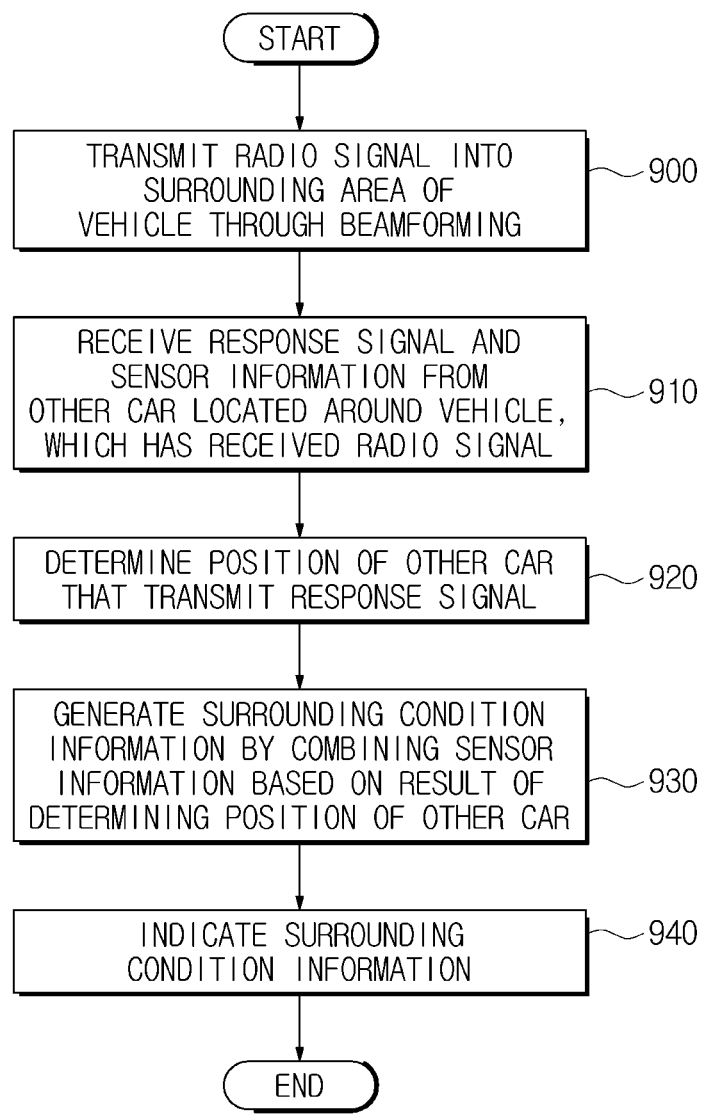

VEHICLE AND METHOD FOR CONTROLLING THE SAME

CROSS-REFERENCE TO RELATED APPLICATION

This application claims the benefit of and priority to under 35 U.S.C. § 119(a) a Korean patent application filed on Mar. 19, 2015 in the Korean Intellectual Property Office and assigned Serial No. 10-2015-0038430, the entire disclosure of which is incorporated herein by reference.

BACKGROUND

1. Technical Field

The present disclosure relates generally to a vehicle and method for controlling the same, and more particularly, to a vehicle which provides information regarding surrounding conditions and a method for controlling the same.

2. Description of the Related Art

A dynamic route guidance system has recently been implemented in modern vehicles allowing drivers to be guided along traveling routes. The dynamic route guidance system can refer to a subsystem for offering a traveling route guidance service by, for instance, providing dynamic traffic information for a vehicle, readjusting a route of the vehicle based on the dynamic traffic information if an unexpected weather condition, closed road, some accident, etc., is encountered, and determining a current location of the vehicle through Global Positioning System (GPS) satellites. Other various systems to guide drivers along a traveling route are being developed for vehicles, as well.

SUMMARY

In accordance with embodiments of the present disclosure, a vehicle includes: a wireless communication device transmitting a radio signal into a surrounding area of the vehicle through beamforming and receiving sensor information, in return, from at least one other vehicle that receives the radio signal; a generator generating surrounding condition information regarding the surrounding area of the vehicle based on the received sensor information; and an indicator indicating the surrounding condition information.

The wireless communication device may transmit the radio signal based on a gap set according to a predetermined beam width.

The wireless communication device may transmit the radio signal by dividing time intervals based on a gap set according to a predetermined beam width.

The wireless communication device may receive a response signal from the at least one other vehicle which has received the radio signal and is located in the surrounding area of the vehicle.

The generator may determine a direction of transmitting a radio signal corresponding to the received response signal and determine position information of the at least one other vehicle based on the determined transmission direction.

The generator may generate the surrounding condition information regarding the surrounding area of the vehicle based on the determined position information of the at least one other vehicle and the received sensor information.

Furthermore, in accordance with embodiments of the present disclosure, a vehicle includes: a wireless communication device receiving position information and sensor information from at least one other vehicle located in a surrounding area of the vehicle through Device-to-Device (D2D) communication; a generator generating surrounding condition information regarding the surrounding area of the vehicle based on the received position information and sensor information and generating sensor information of the vehicle; and an indicator indicating the surrounding condition information.

The vehicle may further include a position measuring device measuring position information of the vehicle.

The generator may determine position information regarding the surrounding area of the vehicle by comparing the position information of the vehicle measured by the position measuring device and the received position information of the at least one other vehicle and generate surrounding condition information by combining the sensor information of the vehicle and the sensor information of the at least one other vehicle with the position information regarding the surrounding area of the vehicle.

The vehicle may further include a sensor unit calculating position information and speed information of the at least one other vehicle located in the surrounding area of the vehicle.

The sensor unit may measure relative position information and relative speed information of the at least one other vehicle located in the surrounding area of the vehicle, calculate position information of the at least one other vehicle based on the measured relative position information of the at least one other vehicle and position information of the vehicle, and calculate speed information of the at least one other vehicle based on the measured relative speed information of the at least one other vehicle and speed information of the vehicle.

The vehicle may further include an identifying unit identifying the at least one other vehicle based on the position information and speed information calculated by the sensor unit and the position information and speed information received through the wireless communication device.

The identifying unit may identify the at least one other vehicle by comparing the position information calculated by the sensor unit and the position information received through the wireless communication unit and by comparing the speed information calculated by the sensor unit and the speed information received through the wireless communication device.

The generator may generate the surrounding condition information by combining a result of the identification of the at least one other vehicle and the received sensor information.

Furthermore, in accordance with embodiments of the present disclosure, a method for controlling a vehicle includes: transmitting a radio signal into a surrounding area of the vehicle through beamforming; receiving sensor information, in return, from at least one other vehicle that receives the radio signal; generating surrounding condition information regarding the surrounding area of the vehicle based on the received sensor information; and indicating the surrounding condition information.

Transmitting the radio signal may include transmitting the radio signal based on a gap set according to a predetermined beam width.

Transmitting the radio signal may include transmitting the radio signal by dividing time intervals based on a gap set according to a predetermined beam width.

Receiving sensor information from the at least one other vehicle may include receiving a response signal from the at least one other vehicle which has received the radio signal and is located in the surrounding area of the vehicle.

Generating surrounding condition information may include: determining a direction of transmitting a radio signal corresponding to the received response signal; and determining position information of the at least one other vehicle based on the determined transmission direction.

Generating surrounding condition information may include generating surrounding condition information regarding the surrounding area of the vehicle based on the determined position information of the at least one other vehicle and the received sensor information Other aspects, advantages, and salient features of the disclosure will become apparent to those skilled in the art from the following detailed description, which, taken in conjunction with the annexed drawings, discloses embodiments of the disclosure.

BRIEF DESCRIPTION OF THE DRAWINGS

The above and other features and advantages of the present disclosure will become more apparent by describing in detail embodiments thereof with reference to the attached drawings in which:

FIG. 11 is a flowchart illustrating operation of a vehicle, which uses radio signals transmitted through beamforming to identify other cars located around the vehicle and create surrounding condition information based on the identification result, according to embodiments of the present disclosure;

Figure 1:
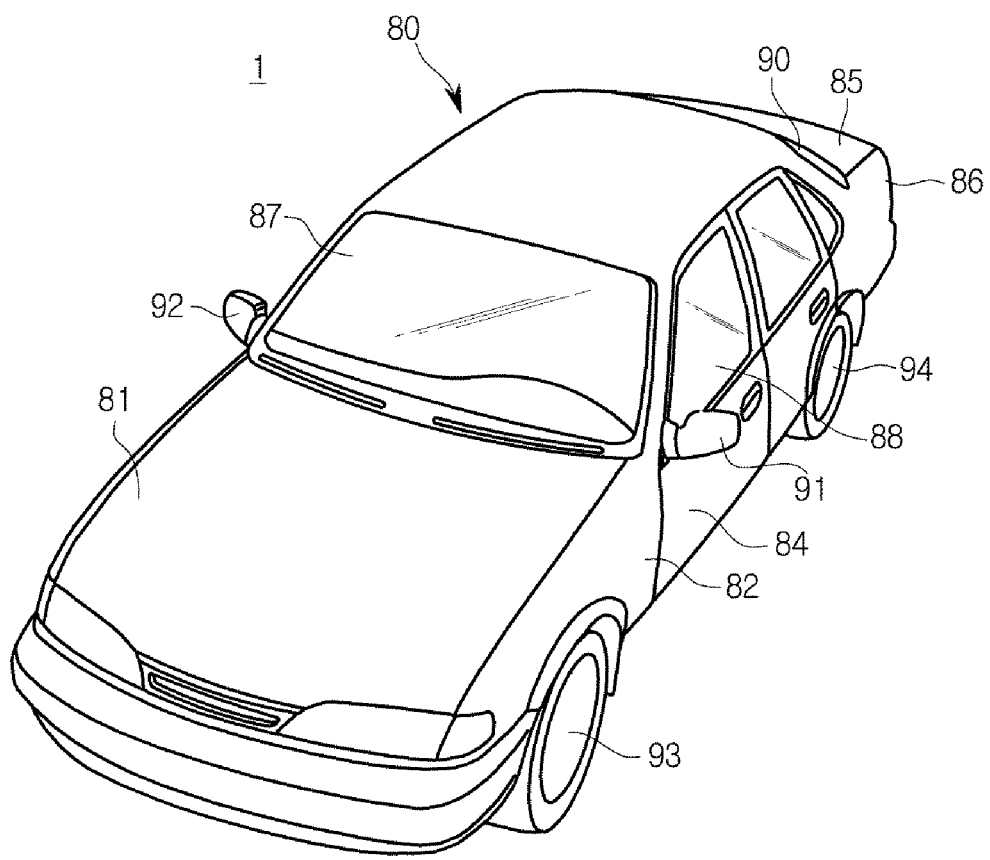
FIG. 1 illustrates external features of a vehicle, according to embodiments of the present disclosure.

Throughout the drawings, like reference numerals will be understood to refer to like parts, components, and structures. It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle," "vehicular," "car," or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Embodiments of the present disclosure will now be described in detail with reference to accompanying drawings.

FIG. 1 illustrates external features of a vehicle, according to embodiments of the present disclosure.

As shown in FIG. 1, a vehicle 1 may include a car frame 80 that forms the exterior of the vehicle 1, and wheels 93, 94 for moving the vehicle 1. The car frame 80 may include a hood 81, a front fender 82, doors 84, a trunk lid 85, and a quarter panel 86, as is generally known in the art.

Furthermore, there may be a front window 87 installed on the front of the car frame 80 to allow the driver and passengers to see a view ahead of the vehicle 1, side windows 88 to allow the driver and passengers to see side views, side mirrors 91, 92 installed on the doors 84 to allow the driver to see views of areas behind and to the sides of the vehicle 80, and a rear window 90 installed on the rear of the car frame 80 to allow the driver or passengers to see a view behind the vehicle 1. Of course, it should be understood that the vehicle 1 described herein and depicted in FIG. 1 can be modified in any suitable manner, as would be understood to one of ordinary skill in the art. Thus, the configuration of the vehicle 1 is not limited to the description provided herein.

Internal features of the vehicle 1 will now be described in more detail.

Figure 2:
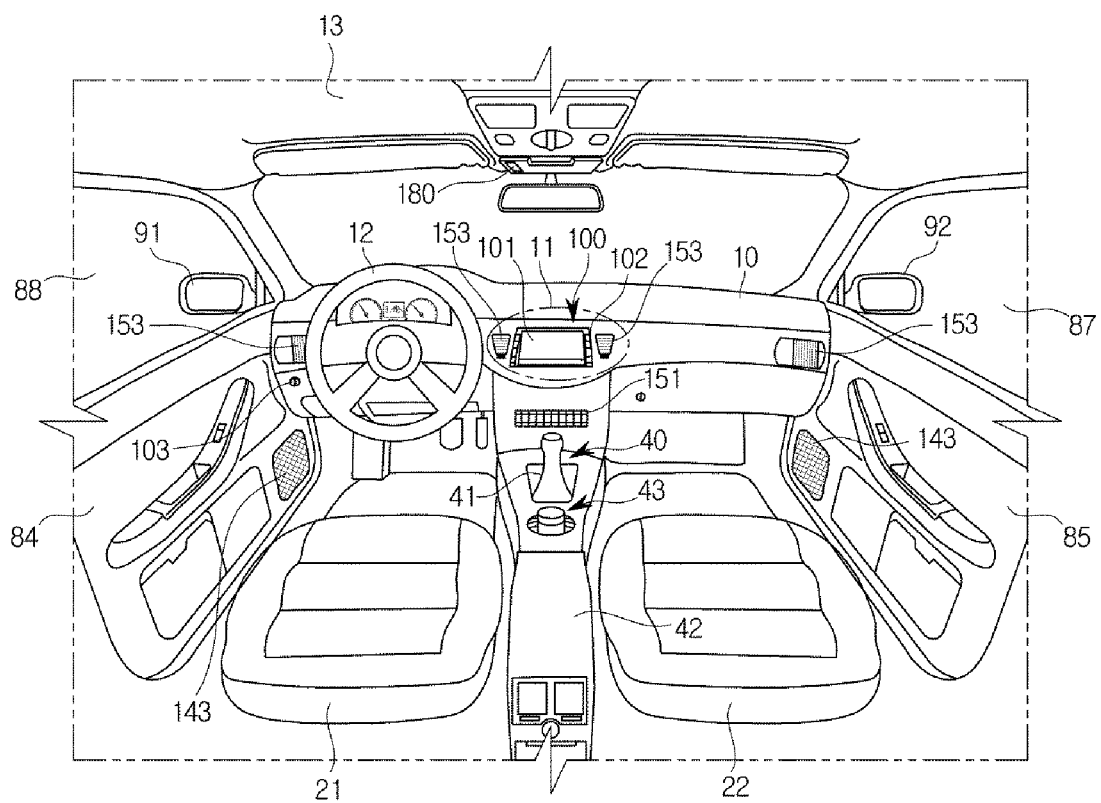
FIG. 2 illustrates internal features of a vehicle, according to embodiments of the present disclosure.
Figure 3:
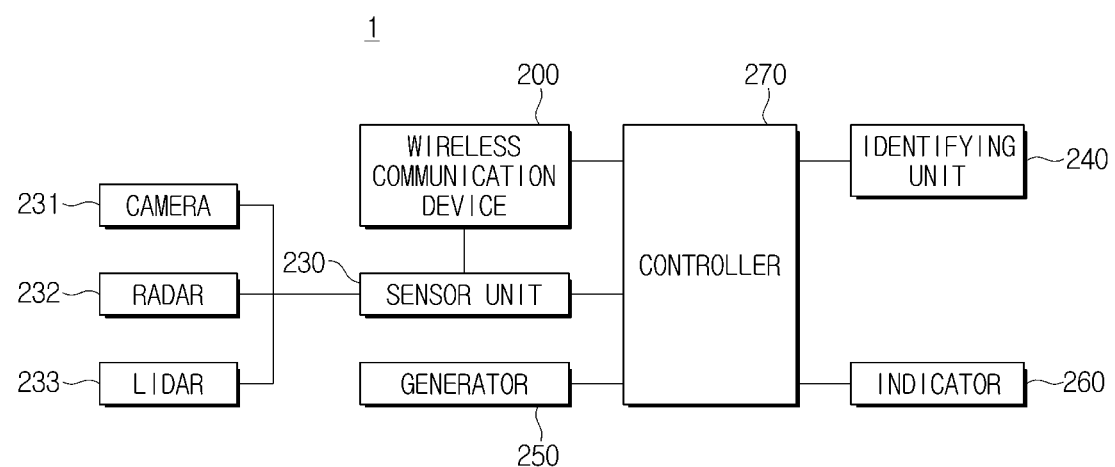
FIG. 3 is a block diagram of a vehicle, according to embodiments of the present disclosure.
Figure 4:
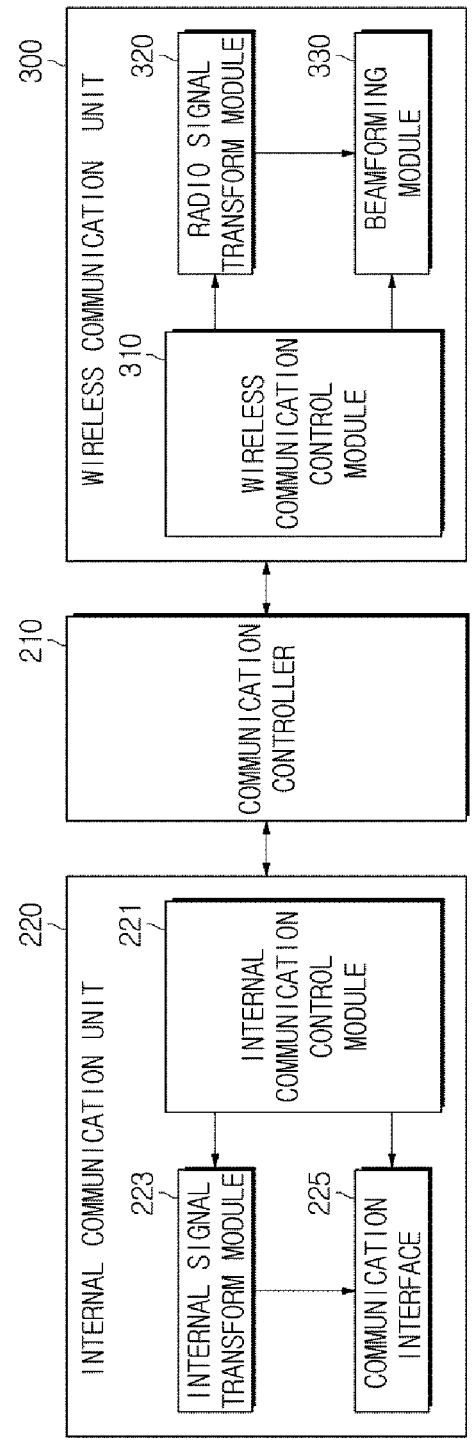
FIG. 4 is a block diagram of a wireless communication device included in a vehicle, according to embodiments of the present disclosure.
Figure 6A:
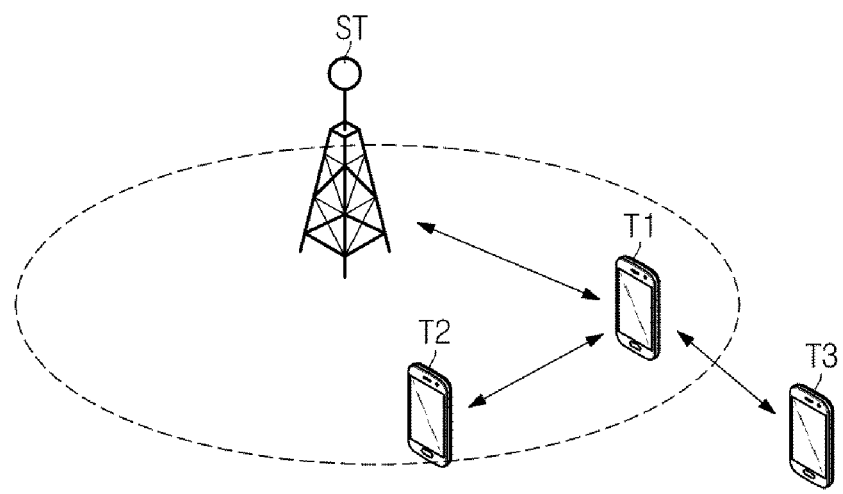
Figure 6B:
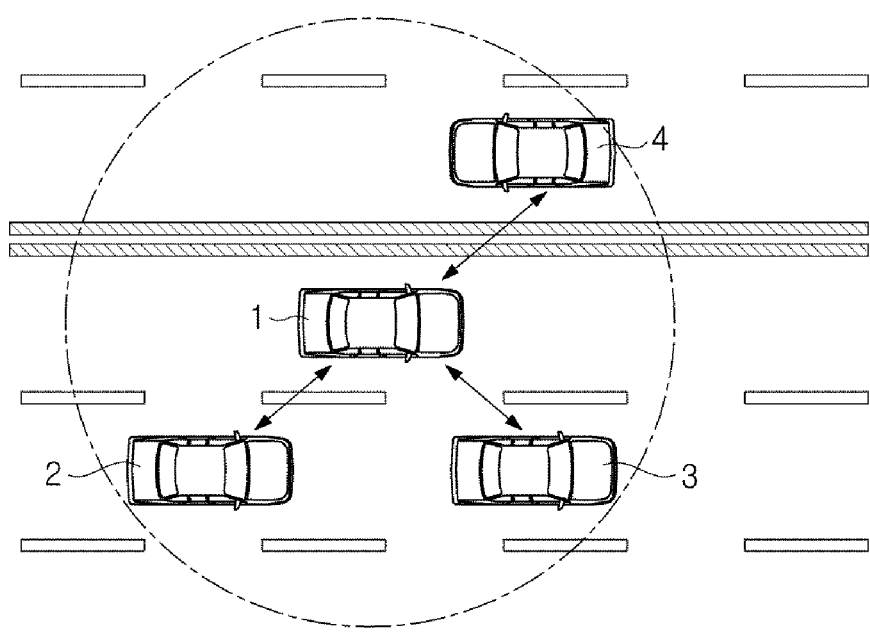
Figure 7:
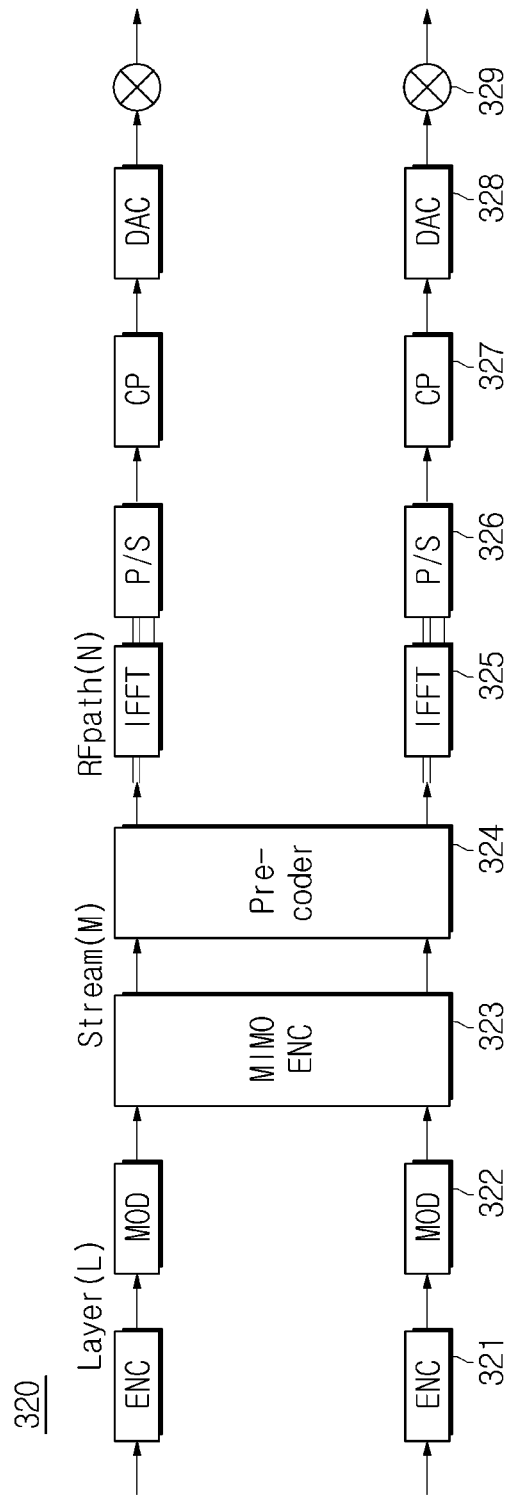
FIG. 7 is a block diagram of a radio signal transform module included in a vehicle, according to embodiments of the present disclosure.
Figure 8:
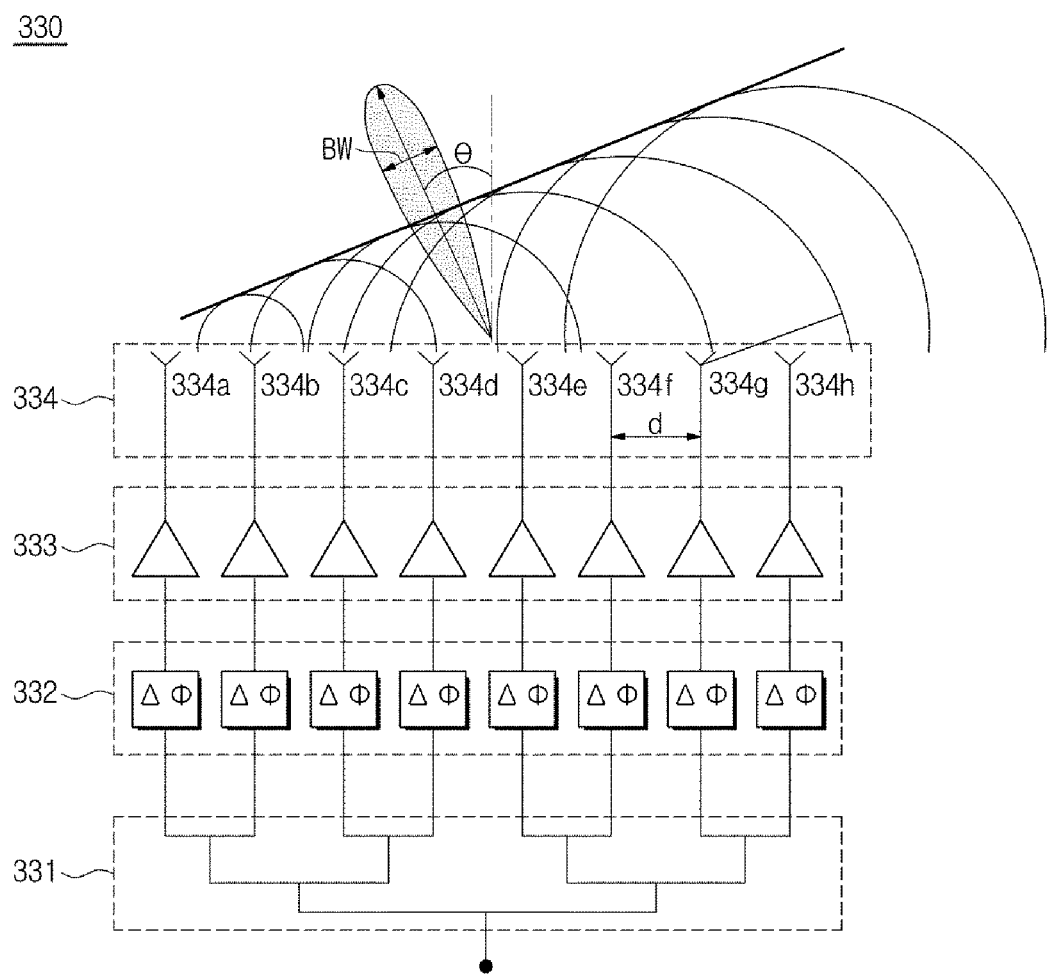
FIG. 8 illustrates a beamforming module included in a vehicle, according to embodiments of the present disclosure.
Figure 9:
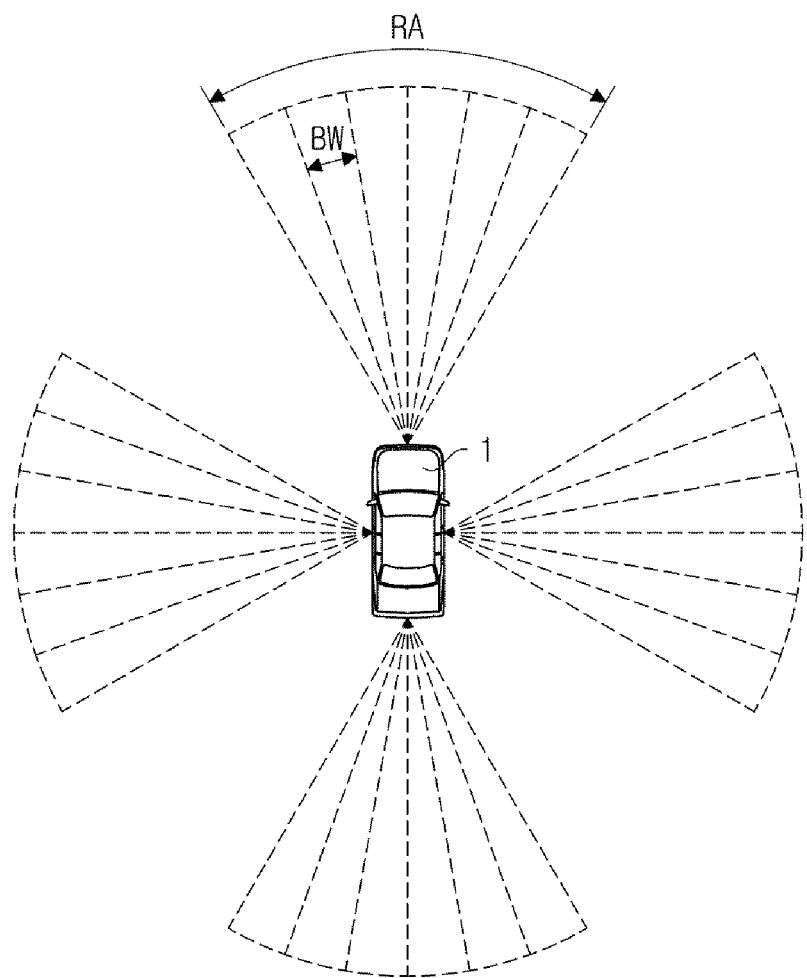
FIG. 9 illustrates a vehicle transmitting radio signals into surrounding areas of the vehicle with a gap set based on beam width, according to embodiments of the present disclosure.
Figure 10A:
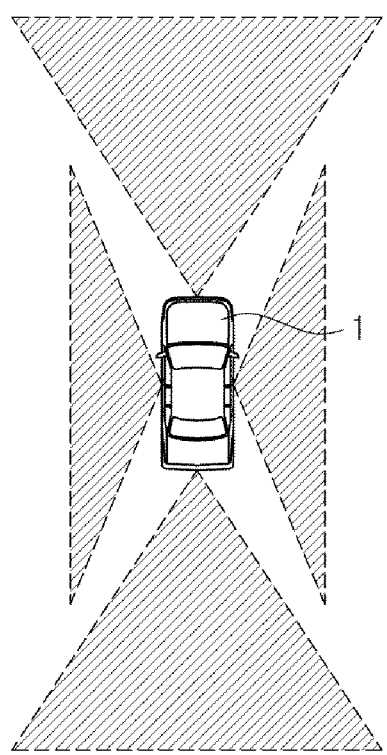
FIGS. 10A, 10B, and 10C illustrate views for explaining detection ranges of sensors of a vehicle, according to embodiments of the present disclosure.
Figure 10B:
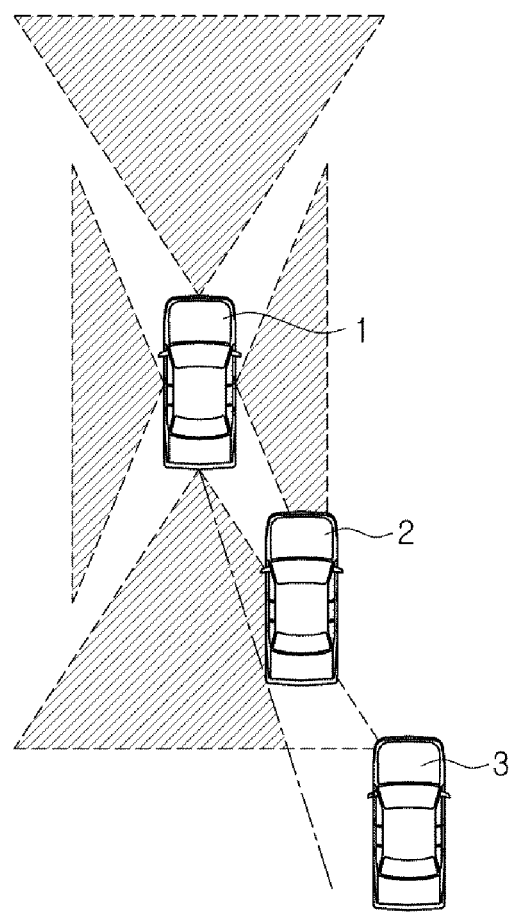
Figure 10C:
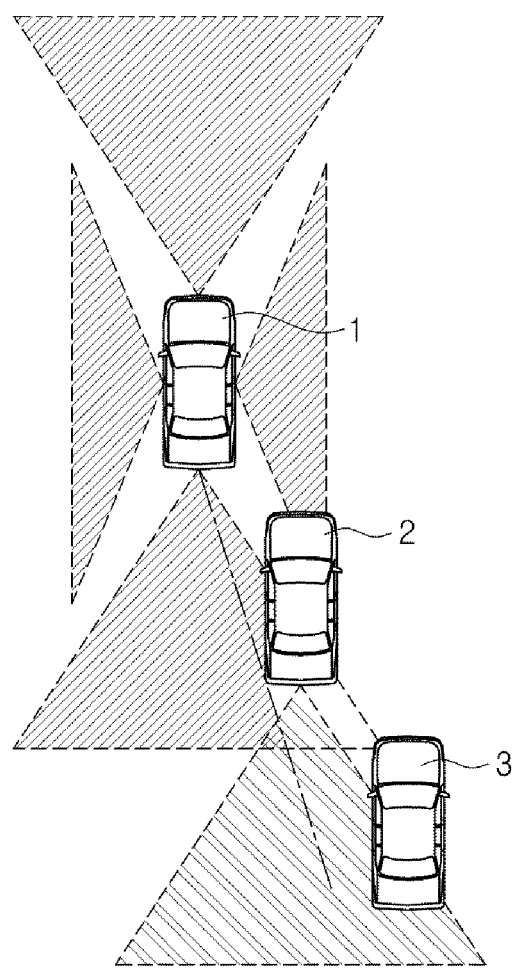

FIG. 2 illustrates internal features of a vehicle, according to embodiments of the present disclosure, and FIG. 3 is a block diagram of a vehicle, according to embodiments of the present disclosure. FIG. 4 is a block diagram of a wireless communication device included in a vehicle, according to embodiments of the present disclosure, FIGS. 5, 6A, 6B, and 6C illustrate views for explaining a fifth generation (5G) communication scheme, FIG. 7 is a block diagram of a radio signal transform module included in a vehicle, according to embodiments of the present disclosure, and FIG. 8 illustrates a beamforming module included in a vehicle, according to embodiments of the present disclosure. FIG. 9 illustrates a vehicle transmitting radio signals into surrounding areas of the vehicle with a gap set based on beam width, according to embodiments of the present disclosure, and FIGS. 10A, 10B, and 10C illustrate views for explaining detection ranges of sensors of a vehicle. The following description will refer to the drawings together to prevent overlapping explanation.

The vehicle 1 may include an air conditioner to perform heating or cooling and release the heated or cooled air through vents 153 to control the temperature inside the vehicle 1. The air conditioner, as will be described below, refers to an apparatus for controlling air conditioning conditions including indoor/outdoor environmental conditions, air suction/exhaustion state, cooling/heating state, etc., of the vehicle 1 automatically or in response to a control instruction from the user.

In embodiments of the present disclosure, the air conditioner may correspond to a Dual-zone Automatic Temperature Controller (DATC). The DATC refers to an automatic temperature control device for setting temperatures for a driver seat 21 and a passenger seat 22, automatically or in response to a control instruction from the user. The vehicle 1 may provide convenience for passengers by individually controlling the air conditioning conditions for the respective driver seat 21 and the passenger seat 22.

The vehicle 1 may further include an Audio/Video and Navigation (AVN) system 100. The AVN system 100 refers to a system for providing not only a navigation function that guides the user to a route to a destination but also audio and video functions in an integrated manner. The AVN system 100 may selectively display at least one of audio, video, and navigation screens through an AVN display 101, and may also display a screen related to an additional function that may be executed in various control screens associated with controlling the vehicle 1 or in the AVN system 100.

In embodiments of the present disclosure, the AVN system 100 may work with the air conditioner and display various control screens associated with controlling the air conditioner through the AVN display 101. In addition, the AVN system 100 may regulate the air conditioning condition in the vehicle 1 by controlling operation status of the air conditioner.

The AVN display 101 may be located in a center fascia 11, which is a center area of a dashboard 10. In embodiments of the present disclosure, the display 101 may be implemented with, but not exclusively, Liquid Crystal Displays (LCDs), Light Emitting Diodes (LEDs), Plasma Display Panels (PDPs), Organic Light Emitting Diodes (OLEDs), Cathode Ray Tubes (CRTs), etc.

A speaker 143 for outputting sounds may be equipped inside the vehicle 1. Accordingly, the vehicle 1 may output a sound through the speaker 143 required in performing audio, video, navigation, and other additional functions.

A navigation input unit 102 may be located in the center fascia 11, the center area of the dashboard 10. The driver may input various control instructions by manipulating the navigation input unit 102. The navigation input unit 102 may be implemented in a hard key type at an area adjacent to the AVN display 101. If the AVN display 101 is implemented in a touch screen type, the AVN display 101 may serve as the navigation input unit 102 as well.

In the meantime, a center input unit 43 of a jog shuttle type or hard key type may be located in a center console 40. The center console 40 corresponds to a part located between the driver seat 21 and the passenger seat 22, and has a gear-shifting lever 41 and a tray 42. The center input unit 43 may perform all or part of the function of the navigation input unit 102.

Referring to FIG. 3, in addition to what are described above, the vehicle 1 may further include a wireless communication device 200, a sensor unit 230, a camera 231, a radar 232, a Light Detection And Ranging (LIDAR) 233, an identifying unit 240, a generator 250, and an indicator 260. The sensor unit 230, identifying unit 240, and generator 250 may be integrated on a system on chip (SOC) embedded in the vehicle 1, and may operate under the control of a processor.

Referring to FIGS. 4, 5, 6, 7, and 8, the wireless communication device 200 may include an internal communication unit 220 for communicating with various electronic devices 100 inside the vehicle 1 over a car communication network NT in the vehicle 1, a wireless communication unit 300 for communicating with external vehicles, mobile terminals, or base stations for wireless communication, and a communication controller 210 for controlling operation of the internal communication unit 220 and wireless communication unit 300.

The internal communication unit 220 may include an internal communication interface 225 connected to the car communication network NT, an internal signal transform module 223 for modulating/demodulating signals, and an internal communication control module 221 for controlling communications over the car communication network NT.

The internal communication interface 225 may transmit and/or receive communication signals to/from various electronic devices 100 inside the vehicle 1 over the car communication network NT. The communication signal refers to signals transmitted and/or received over the car communication network NT.

The internal communication interface 225 may include a communication port for connecting the car communication network NT and the wireless communication device 200, and a transceiver for transmitting/receiving signals.

The internal signal transform module 223 may demodulate a communication signal received through the internal communication interface 223 to a control signal, and modulate a digital control signal output from the communication controller 210 to an analog communication signal for transmission through the internal communication interface 223, under the control of the internal communication control module 221 as will be described below.

As described above, the communication signal refers to signals transmitted/received over the car communication network NT, and the control signal refers to signals transmitted/received inside the wireless communication device 200. The communication signal transmitted/received over the car communication network NT and the control signal transmitted/received between the internal communication unit 220 and the communication controller 210 may have different formats.

For example, in a case of the Control Area Network (CAN) communication, a communication signal may be transmitted through a pair of communication lines, which deliver communication data '1' or '0' depending on the potential difference between the pair of communication lines. In contrast, the control signal transmitted/received between the internal communication unit 220 and the communication controller 210 may be delivered through a single line, having control data '1' or '0' depending on a potential of the single line.

As such, the internal signal transform module 223 may modulate a control signal output by the communication controller 210 to a communication signal according to a communication protocol of the car communication network NT, and demodulate a communication signal according to the communication protocol of the car communication network NT to a control signal that may be recognized by the communication controller 210.

The internal signal transform module 223 may include a memory for storing a program and data to perform modulation/demodulation on the communication signal, and a processor for performing modulation/demodulation on the communication signal according to the program and data stored in the memory.

The internal communication control module 221 may control operation of the internal signal transform module 223 and communication interface 225.

For example, in case of transmitting a communication signal, the internal communication control module 221 may determine whether the car communication network NT is occupied by other electronic device(s) 100 through the internal communication interface 225, and control the internal communication interface 225 and the internal signal transform module 223 to transmit communication signals if the communication network NT is not occupied. Furthermore, in case of receiving a communication signal, the internal communication control module 221 may control the internal communication interface 225 and the internal signal transform module 223 to demodulate the communication signal received through the internal communication interface 225.

The internal communication control module 221 may include a memory for storing a program and data to control the internal signal transform module 223 and the internal communication interface 225, and a processor for generating a control signal according to the program and data stored in the memory.

The internal signal transform module 223 and the internal communication control module 221 may be implemented with separate memories and processors in some embodiments, or with an integrated memory and processor in other embodiments.

In some embodiments of the present disclosure, the internal communication control module 221 may be omitted. For example, the internal communication control module 221 may be integrated into the communication controller 210 as will be described below, in which case the communication controller 210 may directly control signal transmission/reception of the internal communication unit 220.

The wireless communication unit 300 may wirelessly exchange signals with vehicles, mobile terminals, or base stations for wireless communication.

The wireless communication unit 300 may exchange signals according to various communication protocols.

For example, the wireless communication unit 300 may employ a second generation (2G) communication scheme, such as Time Division Multiple Access (TDMA), Code Division Multiple Access (CDMA), etc., a third generation (3G) communication scheme, such as Wide Code Division Multiple Access (WCDMA), Code Division Multiple Access 2000 (CDMA2000), Wireless Broadband (Wibro), World Interoperability for Microwave Access (WiMAX), etc., and a fourth generation (4G) communication scheme, such as Long Term Evolution (LTE), Wireless Broadband Evolution (Wibro Evolution), etc. In addition, the wireless communication unit 300 may employ a fifth generation (5G) communication scheme.

The 4G communication scheme uses frequency band of about 2 GHz or less while the 5G communication scheme uses frequency band of about 28 GHz. However, the frequency band used by the 5G communication scheme is not limited thereto.

For the 5G communication scheme, a large-scale antenna system may be employed. The large-scale antenna system refers to a system that may use more than tens of antennas to cover even ultra-high frequency band and simultaneously transmit/receive a large amount of data through multiple accesses. Specifically, the large-scale antenna system may allow mass communication and expand the coverage of a 5G communication network, by adjusting an array of antenna elements to transmit/receive radio waves farther away in a particular direction.

Figure 5:
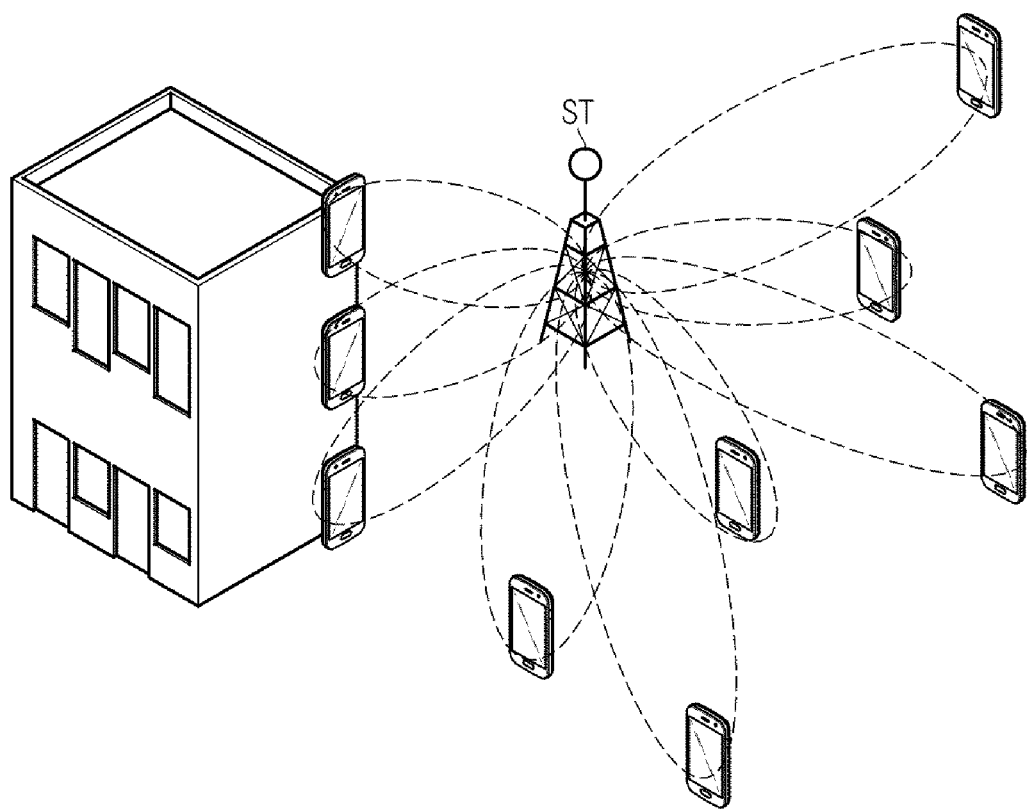
FIGS. 5, 6A, 6B, and 6C illustrate views for explaining a fifth generation (5G) communication scheme, according to embodiments of the present disclosure.

Referring to FIG. 5, a base station ST may be able to transmit and receive data simultaneously with many devices via the large-scale antenna system. Furthermore, the large-scale antenna system may help to improve transmission quality and to reduce an amount of power, by minimizing radio waves to leak out in other directions than the direction in which the radio waves are transmitted, to reduce noise.

Furthermore, unlike existing schemes that modulate transmit signals in an Orthogonal Frequency Division Multiplexing (OFDM) scheme, the 5G communication scheme may transmit radio signals modulated in a Non-Orthogonal Multiplexing Access (NOMA) scheme, and may thus allow multiple access of more devices and enable simultaneous mass transmission/reception.

For example, the 5G communication scheme may provide a transmission rate of up to 1 Gbps. The 5G communication scheme may support immersive communication that requires mass transmission, such as Ultra-HD (UHD), 3D, hologram, etc. Accordingly, the user may exchange ultra-high amount of data that is more sophisticated and immersive at faster rates, according to the 5G communication scheme.

Furthermore, the 5G communication scheme may enable real-time processing with a maximum response rate of about 1 ms or less. Accordingly, the 5G communication scheme may support real-time services that respond before recognition of the user. For example, the vehicle may receive sensor information from various devices even while driving, to provide an automatic driving system through real-time processing and provide a variety of remote control functions. Furthermore, the vehicle may inform the user of a probability of a car crash in real-time and provide sets of information about traffic situations that may occur in the traveling route in real-time, by processing the sensor information regarding other cars located around the vehicle according to the 5G communication scheme.

In addition, through the ultra real-time processing and mass transmission supported by the 5G communication, the vehicle may offer a big data service to passengers of the vehicle. For example, the vehicle may analyze various web information, Social Networking Service (SNS) information, etc., to provide customized information that suits situations of the passengers in the vehicle. In an embodiment, the vehicle may collect information about various gourmet restaurants and interesting things that are located around the traveling route through big data mining, and provide them in real-time, thereby allowing the passengers to check the information on the spot.

In the meantime, the 5G communication network may further divide a cell to provide high densification and mass transmission of the network. The cell as herein used refers to a section segmented into small sections, to efficiently use the frequency in mobile communication. In this regard, a low power base station (BS) may be installed in each cell to support communications between terminals. For example, the 5G communication network may be formed in a two-stage structure of macrocell base station—distributed small base stations—communication terminals by reducing the size of the cell to further segment the cell.

Furthermore, the 5G communication network may enable relayed transmission of radio signals through a multihop scheme. For example, as shown in FIG. 6A, a first terminal T1 may relay radio signals to be transmitted by a third terminal T3 located outside a network of a base station ST of the first terminal T1 to the base station ST. Furthermore, the first terminal T1 may relay radio signals to be transmitted by a second terminal T2 located within the network of the base station ST of the first terminal T1 to the base station ST. As described above, at least one of devices able to use the 5G communication network may perform relayed transmission through the multihop scheme, but is not limited thereto. This may solve a buffering problem created when there are many users in a cell while expanding a coverage supported by the 5G communication network.

The 5G communication scheme enables Device-to-Device (D2D) communication applied to vehicles, wearable devices, etc. D2D communication is performed between devices, and refers to communication for the devices to transmit and receive radio signals that contain various data including data detected by sensors and data stored in the device. According to the D2D communication scheme, radio signals are wirelessly communicated between devices without need to pass a base station, thereby eliminating unnecessary consumption of energy. In order for a vehicle, wearable device, or the like to use the 5G communication scheme, an antenna needs to be contained in the device.

The vehicle 1 may exchange radio signals with other cars located around the vehicle through D2D communication. For example, the vehicle 1 is able to perform D2D communication with other cars V1, V2, and V3 located around the vehicle, as shown in FIG. 6B. Besides, the vehicle 1 is able to perform D2D communication with a traffic information system (not shown) installed e.g., at an intersection.

Figure 6C:
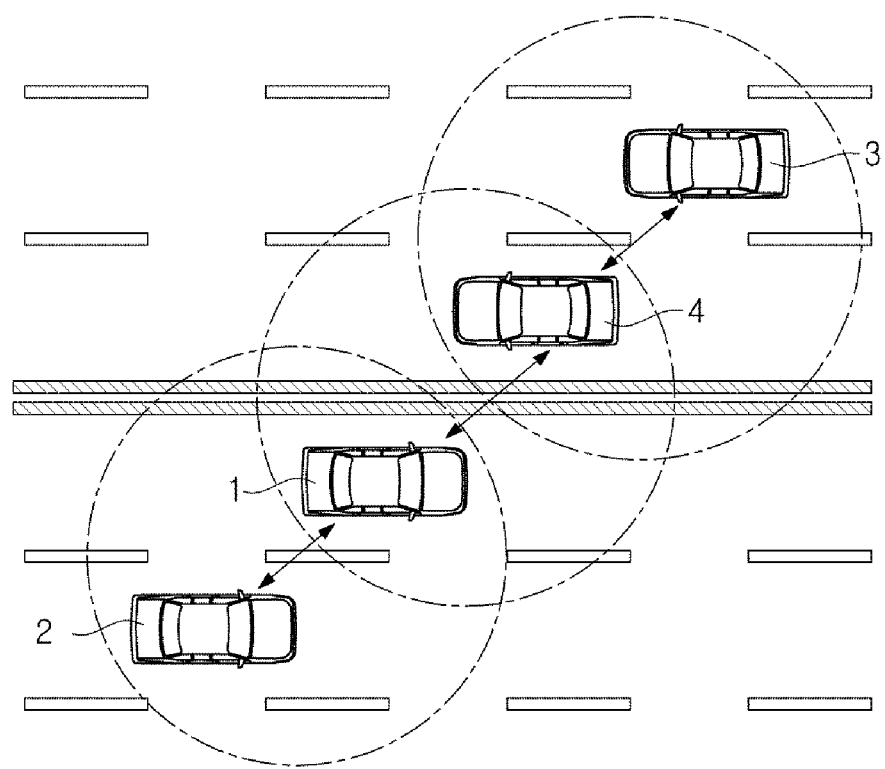

In another example, the vehicle 1 may exchange radio signals with the first and third cars V1 and V3 through D2D communication while the third car V3 may exchange data with the vehicle 1 and the second car V2, as shown in FIG. 6C. That is, a virtual network is created among a plurality of cars 1, V1, V2, and V3, which are located within a range in which D2D communication is available, allowing transmission and reception of radio signals.

In the meantime, the 5G communication network may expand coverage of the D2D communication to enable communication between devices located farther from each other. Furthermore, since the 5G communication network supports real-time processing with a response rate of 1 ms or less and mass communication of 1 Gbps or more, moving vehicles may exchange signals including desired data with each other.

For example, a moving vehicle may access other cars, various servers and systems in real-time, which are located around the vehicle, exchange data with them, and process the data to offer various services, such as a route guidance service with the use of augmented reality, according to the 5G communication scheme.

In addition, the vehicle may use a frequency band, which is different from one described above, to exchange radio signals including data via a base station or through D2D communication, but the present disclosure is not limited to a communication scheme that uses such frequency band.

It is assumed herein that the wireless communication unit 300 may employ the 5G communication scheme.

As shown in FIG. 4, the wireless communication unit 300 may include a radio signal transform module 320 for modulating/demodulating signals, a beamforming module 330 for transmitting/receiving radio signals by forming a beam pattern for wireless communication and propagating the beam pattern, and a wireless communication control module 310 for controlling wireless communication.

The radio signal transform module 320 may demodulate a wireless communication signal received through the beamforming module 330 to a control signal, and modulate a control signal output from the communication controller 210 to a wireless communication signal for transmission through the beamforming module 330, under the control of the wireless communication control module 310 as will be described below.

The wireless communication signal transmitted/received through wireless communication may have a format that is different from a format of the control signal, to secure reliability of wireless communication. Especially, unlike the wireless communication signal being an analog signal, the control signal is a digital signal.

The wireless communication signal may be transmitted on a carrier wave of a high frequency, e.g., about 28 GHz for the 5G communication scheme. For this, the radio signal transform module 320 may generate a communication signal by modulating a carrier wave according to a control signal from the communication controller 210, and restore a control signal by demodulating a communication signal received through an array antenna 340.

For example, as shown in FIG. 7, the radio signal transform module 320 may include an encoder (ENC) 321, a modulator (MOD) 322, a multiple input multiple output (MIMO) encoder 323, a pre-coder 324, an inverse fast Fourier transformer (IFFT) 325, a parallel-to-serial converter (P/S) 326, a cyclic prefix (CP) inserter 327, a digital-to-analog converter (DAC) 328, and a frequency transformer 329.

L control signals may be input to the MIMO encoder 323 via the encoder 321 and modulator 322. M streams output from the MIMO encoder 323 may be pre-coded by the pre-coder 324 into N pre-coded signals. The pre-coded signals may be output as analog signals via the IFFT 325, P/S converter 326, CP inserter 327, and DAC 328. The analog signal output from the DAC 328 may be transformed by the frequency transformer 329 into a radio frequency (RF) band.

The radio signal transform module 320 may include a memory for storing a program and data to perform modulation/demodulation on the communication signal, and a processor for performing modulation/demodulation on the communication signal according to the program and data stored in the memory.

However, the radio signal transform module 320 is not limited to what is shown in FIG. 7, and may have other various forms depending on communication schemes.

The analog signal transformed into the radio frequency band may be input to the beamforming module 330.

The beamforming module 330 may form a beam pattern for wireless communication under the control of the wireless communication control module 310 as will be described below, to transmit or receive radio signals.

The 5G communication scheme may transmit radio signals radially, or transmit them into a particular region or to a particular device through beamforming. The 5G communication scheme may use a millimeter wave band, to transmit radio signals through beamforming. The millimeter wave band herein refers to a band from about 30 GHz to about 300 GHz, but is not limited thereto.

The beamforming module 330 may use a phased-array antenna to form a beam pattern.

The beam pattern is represented by intensities of radio signals if the radio signals are concentrated in a particular direction. In other words, the beam pattern refers to a pattern along which power of the radio signal is intensified. Accordingly, the vehicle 1 may transmit a radio signal with sufficient intensity to a communication target, e.g., an external car, external terminal or base station, which is located within the beam pattern, and may receive a radio signal with sufficient intensity from the communication target.

As the communication target goes further away from the center of the beam pattern, the intensity of a radio signal transmitted by the vehicle 1 to the communication target decreases and the intensity of a radio signal received by the vehicle 1 from the communication target also decreases.

The phased-array antenna is an antenna with antenna elements regularly arrayed, and may control a beam pattern of the entire array antenna by controlling a phase difference of radio signals output from the respective antenna elements.

For example, as shown in FIG. 8, the beamforming module 330 may include a power distributor 331 for distributing power of an analog signal output from the radio signal transform module 320, a phase transformer 332 for converting a phase of the analog signal, a variable gain amplifier 333 for amplifying power of the analog signal, and an array antenna 334 for transmitting/receiving the analog signal.

The beamforming module 330 may distribute power of an analog signal to the respective antenna elements 334a to 334h by means of the power distributor 331, and form various beam patterns BPs by controlling the power delivered to the respective antenna elements 334a to 334h by means of the phase transformer 332 and variable gain amplifier 333.

In this regard, if a main direction of the beam pattern BP of radio waves to be output from the array antenna 334 is $\theta$, a phase difference $\Delta\varphi$ through the phase transformer 332 may be expressed in the following Equation 1:

$$\Delta\phi = -\frac{2\pi d}{\lambda}\cos\theta \tag{1}$$

$\Delta\varphi$ denotes a phase difference, d denotes a gap between antenna elements, $\lambda$ denotes a wavelength of a carrier wave, and $\theta$ denotes a main direction of the beam pattern.

According to Equation 1, the main direction $\theta$ of the beam pattern BP may be determined depending on the phase difference between the antenna elements 334a to 334h, and a gap d between the antenna elements 334a to 334h.

3 dB beam width (BW) to be output from the array antenna 334 may be expressed in the following Equation 2:

$$BW \simeq \sin^{-1}\left(\frac{2\times 1.391\lambda}{\pi dN}\right). \tag{2}$$

BW denotes a beam width of the beam pattern, d denotes a gap between antenna elements, $\lambda$ denotes a wavelength of a carrier wave, and N denotes the number of antenna elements of the array antenna.

According to Equation 2, the beam width BW of the beam pattern BP may be determined depending on the gap d between the antenna elements 334a to 334h, and the number N of the antenna elements 334a to 334h.

The wireless communication control module 310 may control operation of the radio signal transform module 320 and beamforming module 330.

For example, if communication with an external vehicle, external terminal, or external base station is established, the wireless communication control module 310 may control the radio signal transform module 320 and beamforming module 330 to estimate an optimum communication channel. Specifically, the wireless communication control module 310 may estimate a wireless communication channel based on the beam pattern BP, and generate an optimum wireless communication channel based on the estimation result.

In case of transmitting a communication signal, the wireless communication control module 310 may control the beamforming module 330 to form a beam pattern BP to transmit the communication signal. Specifically, the wireless communication control module 310 may control the phase difference $\Delta\Phi$ between the antenna elements 334a to 334h to control the main direction $\theta$ of the beam pattern BP formed by the beam forming module 330. Furthermore, in case of receiving a communication signal, the wireless communication control module 310 may control the beamforming module 330 to form a beam pattern BP to receive the communication signal.

The wireless communication control module 310 may include a memory for storing a program and data to control the radio signal transform module 320 and the beamforming module 330, and a processor for generating a control signal according to the program and data stored in the memory.

The radio signal transform module 320 and the wireless communication control module 310 may be implemented with separate memories and processors in some embodiments, or with an integrated memory and processor in other embodiments.

In some embodiments of the present disclosure, the wireless communication control module 310 may be omitted. For example, the wireless communication control module 310 may be integrated into the communication controller 210 as will be described below, in which case the communication controller 210 may directly control signal transmission/reception of the wireless communication unit 300.

The communication controller 210 may control operation of the internal communication unit 220 and wireless communication unit 300.

Specifically, upon reception of a signal through the internal communication unit 220, the communication controller 210 may analyze the received signal and control operation of the internal communication unit 220 and wireless communication unit 300 based on the analysis result.

For example, upon reception of a data transmission request from other electronic device 100 included in the vehicle 1 through the internal communication unit 220, the communication controller 210 may control the wireless communication unit 300 to transmit the corresponding data to an external vehicle, external terminal, or external base station.

Furthermore, upon reception of data from an external vehicle, external terminal, or external base station, the communication controller 210 may analyze the received data to determine a target device for the data, and control the internal communication unit 220 to transmit the data to the target device.

The communication controller 210 may include a memory for storing a program and data to control the internal communication unit 220 and the wireless communication unit 300, and a processor for generating a control signal according to the program and data stored in the memory.

The wireless communication device 200 may be connected to at least one car located around the vehicle 1 by the aforementioned components through D2D communication for exchanging signals including various data.

For example, the wireless communication device 200 may receive a radio signal including at least one of sensor information and position information from other car(s) through D2D communication. In another example, the wireless communication device 200 may receive a radio signal including speed information from other car(s) through D2D communication.

Furthermore, the wireless communication device 200 may identify at least one car located around the vehicle 1. In embodiments of the present disclosure, the wireless communication device 200 may transmit a radio signal to other car(s) located around the vehicle 1 through beamforming. The other car may then transmit a response signal to the vehicle 1 through D2D communication, in response to the received radio signal. To figure out a location of the other car located around the vehicle 1, the wireless communication device 200 may consecutively transmit radio signals with a gap set based on beam width. The wireless communication device 200 may transmit radio signals with a gap set based on beam width BW as shown in FIG. 10, and identify the location of the other car based on the received response signal. The wireless communication device 200 may transmit radio signals with a gap set based on a transmission cycle. Specifically, the wireless communication device 200 may simultaneously transmit radio signals into all areas included in a scanning range RA, or alternatively, transmit radio signals based on a transmission cycle for each beam width BW.

In return for transmitting radio signals, the wireless communication device 200 may receive radio signals including a response signal and sensor information from other cars. The sensor information refers to information detected by sensors equipped in the other cars. For example, the sensor information may include various information detected through a LIDAR, camera, radar, etc. In addition, the sensor information may include all information detected by various sensors equipped in the other cars for detecting surrounding conditions.

Furthermore, the vehicle 1 may have sensors equipped therein to detect information about surrounding areas of the vehicle 1. Accordingly, the sensor unit 230 may collect detection results of the sensors equipped in the vehicle 1. For example, the sensor unit 230 may collect detection results from various devices for detecting surrounding areas of the vehicle 1, such as the camera 231, radar 232, LIDAR 233, etc., as shown in FIG. 3.

In this regard, detection ranges of the respective devices may be set in advance. For example, a detection range of each device may be set up to a maximum detectable range, but is not limited thereto. For example, the radar 232 may be able to detect a range of up to about 200 km, but may be set to have a detection range of about 20 km. In another example, the camera 231 may be set to have a detection range of about 200 m, which corresponds to a maximum detection range. That is, the sensor unit 230 may be set to have a detection range, which may correspond to a maximum detectable range, according to specifications of the respective devices, but is not limited thereto. The detection range may be set in advance, and the sensor unit 230 may calculate various data using some sets of collected sensor information, which are detected within the detection range.

For example, the sensor unit 231 may take a picture of other car(s) located around the vehicle 1 through the camera 231, and accordingly, measure relative speed information based on changes in location of the other car. The relative speed information refers to information about speed of the other car viewed from the vehicle 1. The sensor unit 230 may calculate speed information of the other car using the relative speed information and speed information of the vehicle 1.

Furthermore, the sensor unit 231 may take a picture of other car(s) located around the vehicle 1 through the camera 231, and accordingly, measure relative position information. The relative position information refers to information about a relative location of the other car viewed from the vehicle 1. The sensor unit 230 may calculate position information of the other car using the relative position information and position information of the vehicle 1. In addition, the sensor unit 230 may measure relative position information and relative speed information of the other car using various sensors, such as the radar 232, LIDAR 233, etc., and accordingly, calculate position information and speed information.

The sensor unit 230 may collect sensor information about surrounding areas of the vehicle 1 through at least one sensor, as described above. Accordingly, the generator 250 may generate surrounding condition information based on sensor information about a surrounding area of the vehicle 1 collected by the sensor unit 230, sensor information received from another car, and position information of the other car. The surrounding condition information herein refers to information generated by combining sets of sensor information of the vehicle 1 and the other car. Specifically, the generator 250 may figure out relationships of locations between the vehicle 1 and other cars, and generate the surrounding condition information by matching sets of sensor information based on the relationships.

For example, FIG. 10A illustrates an area detectable by sensors of the vehicle 1. Sensor information about surrounding areas of the vehicle 1 may include information detected for the area of FIG. 10A. In this regard, as shown in FIG. 10B, if there is a first vehicle 2 located in the surrounding area of the vehicle 1, a sensor of the vehicle 1 may be unable to detect the rear area of the first vehicle 2. This allows the driver of the vehicle 1 to only obtain limited information because the sensor of the vehicle 1 is unable to detect a third vehicle 3 located behind the first vehicle 2.

To address the problem, as shown in FIG. 10C, the generator 250 may generate surrounding condition information by combining sensor information of the vehicle 1, sensor information of other cars located in surrounding areas of the vehicle 1, such as the sensor information of the first vehicle 2, to figure out information about an area that the driver of the vehicle 1 is unable to see, thereby helping the driver drive more safely.

Alternatively, the surrounding condition information may be generated by combining sensor information of other cars in addition to the sensor information collected through the sensor of the vehicle 1. For example, referring to FIG. 10B, an area detectable by the sensor of the vehicle 1 may partially overlap an area detectable by a sensor of the first vehicle 2. Furthermore, although not shown in the drawings, there may be other cars around the vehicle 1 in addition to the first vehicle 2, and the areas detectable by sensors of the other cars may also overlap the area detectable by the sensor of the vehicle 1. Accordingly, the generator 250 may generate surrounding condition information by combining sets of sensor information of the other cars only.

An identifying unit 240 may identify at least one car located around the vehicle 1. There may be many different methods for identifying other cars located around the vehicle 1, in addition to the aforementioned beamforming-based method.

For example, the identifying unit 240 may identify the other car located around the vehicle 1 by comparing position information and speed information of the other car calculated by the sensor unit 230 with position information and speed information received from the other car through the wireless communication device 200.

The identifying unit 240 may determine whether the position information of the other car calculated by the sensor unit 230 and the position information received from the other car through D2D communication are within a predetermined margin of error. Furthermore, the identifying unit 240 may determine whether the speed information of the other car calculated by the sensor unit 230 and the speed information received from the other car through D2D communication are within a predetermined margin of error. If it is determined that the calculated position information and speed information and the received position information and speed information are within the predetermined margin of error, the identifying unit 240 may determine that the position information calculated by the sensor unit 230 is correct and that the other car is located at the corresponding location. Accordingly, the identifying unit 24 may increase accuracy of position information of the other car. A position measuring device for measuring position information may be included in the vehicle 1 as well as in other car(s).

The position measuring device may include, but not is not limited to, a Global Positioning System (GPS) for measuring the position with satellites, and a Differential Global Positioning System (DGPS) that supplements the GPS and is capable of measuring a position with high precision. Location information (or position information) transmitted to a terrestrial GPS from a satellite often has an error. For example, if there are N GPSs (N≥2) located close to one another, the N GPSs may have similar errors. In this regard, DGPS may obtain more accurate data by offsetting common errors that the N GPSs have to each other. Accordingly, the generator 250 may generate surrounding condition information based on the identification result of the identifier 240.

The surrounding condition information may be implemented by an image or video. The generator 250 may generate the surrounding condition information by matching a plurality of sets of sensor information.

Sets of sensor information collected at different points of time may be obtained from different coordinate systems. If specifications, photographing magnifications, etc., of cameras equipped in respective cars are different, the size of a target object in images captured by the cameras of the respective vehicles may be different even when the same target object is captured.

A matching scheme refers to a process of matching different coordinates of different sets of sensor information into one coordinates. That is, the generator 250 may generate surrounding condition information by performing a matching scheme on a plurality of sets of image information. The matching scheme may be performed in various ways already known to the public.

For example, the matching scheme may include an image subtraction scheme, a principal axes scheme, a joint entropy scheme, a mutual information scheme, a cross-correlation scheme. The image subtraction scheme is an intuitive process of measuring similarity, by which two images are matched with respect to a point at which difference in brightness between the two images becomes the minimum. The principal axes scheme is a process of transforming a target object into an approximate position by calculating the center of gravity of the target object to be matched in an image, obtaining the major axis of the respective axes from the center of gravity to rotate and shift the target object as much as the difference.

The joint entropy scheme is a process of matching images by generating joint histograms using brightness values at overlapping locations of two images and calculating probability density based on the joint histograms to figure out a location at which entropy becomes the minimum. The mutual information scheme is a process of matching images taking into account marginal entropy if there is a big difference between the images to be matched. The cross-correlation scheme is a process of extracting or dividing features or areas to match images based on a location at which the correlation becomes the greatest.

A matching scheme used by the generator 250 to generate surrounding condition information is not limited to the aforementioned matching schemes, but any other matching schemes may be used to generate the surrounding condition information.

In matching a plurality of images, an empty area or distortion of a boundary area may be created. Accordingly, the generator 250 may compensate the empty area or the boundary area in matching the plurality of images. For example, the generator 250 may perform a blending process on a boundary area to minimize distortion of an image in matching a plurality of images. In another example, if an empty area is created while two images are matched, the generator 250 may interpolate it by referring to the other image, or handle it as empty space, but this compensation method is only by way of example.

The indicator 260 may be implemented with various devices capable of indicating the surrounding condition information. For example, the indicator 260 may be implemented with the aforementioned AVN display 101, a head-up display (HUD), or a windshield display.

The HUD is a display for providing information on the front window 87 of the vehicle 1, and may display sets of information on the front window 87 in real-time, which are required in driving, thereby helping the driver obtain information required in driving while securing a field of view for the driver. The HUD may be of a windshield type that displays virtual lanes by projecting light on a reflecting mirror and having the light reflected from the reflecting mirror be reflected on the front window 87, and of a combiner type that displays virtual lanes on a separately equipped screen. The HUD in the vehicle 1 in accordance with embodiments of the present disclosure may include both types.

The indicator 260 may indicate information about surrounding conditions viewed, but not exclusively, from the driver or in a particular field of view, such as in a bird viewing method.

The controller 270 may control general operation of the vehicle 1. Specifically, the controller 270 may control operation of not only various modules contained in the AVN system 100 but also all the components equipped in the vehicle 1. The controller 270 may generate control signals to control the components of the vehicle 1.

For example, the controller 270 may control operation of the generator 250 to generate surrounding condition information with a control signal. In another example, the controller 270 may control the indicator 260 to indicate the surrounding condition information with a control signal.

Operation flows of the vehicle 1 to identify other cars located around the vehicle 1 and generate and indicate surrounding condition information based on the identification results in different methods will now be described.

FIG. 11 is a flowchart illustrating operation of a vehicle to identify other cars located around the vehicle through beamforming and generate and indicate surrounding condition information, according to embodiments of the present disclosure.

A vehicle may transmit radio signals into surrounding areas of the vehicle through beamforming, in operation 900. In this regard, the vehicle may divide a scanning range by beam widths, and set a time for transmission of a radio signal for each beam width, which may be different from a time for transmission for another beam width. For example, as shown in FIG. 9, the vehicle may transmit radio signals into a scanning range RA through beamforming, in which case the radio signals may be individually transmitted depending on beam widths BA. Accordingly, the vehicle may transmit radio signals for the respective beam widths BA with a time gap, and upon reception of a corresponding response signal, figure out a location of other car(s) based on the direction of transmitting the radio signal. Furthermore, the vehicle may set an order of transmitting radio signals in advance, and transmit the radio signals in the order in set directions. For example, referring to FIG. 9, the vehicle may transmit radio signals clockwise or counterclockwise, but is not limited thereto.

In return for transmission of the radio signals, the vehicle may receive a radio signal including a response signal to the radio signal and sensor information from other car located in the corresponding beam width BA, in operation 910. As described above, the vehicle may divide time intervals based on beam width BW to transmit radio signals, and determine a position of the other car based on whether a corresponding response signal has been received, in operation 920.

The vehicle may generate surrounding condition information by combining sensor information collected from the vehicle and sensor information collected by the other car based on the result of determining the position of the other car, in operation 930. The surrounding condition information refers to information about a condition in the surrounding area of the vehicle.

Figure 14:
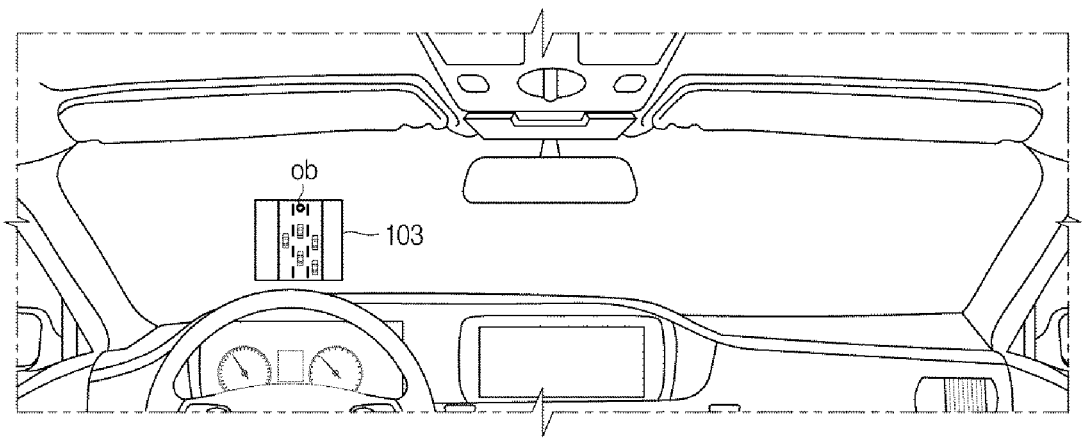
FIG. 14 illustrates a screen displaying surrounding condition information through a head-up display, according to embodiments of the present disclosure.

The vehicle may indicate the surrounding condition information through a device in the vehicle. For example, the vehicle may display the surrounding condition information through the HUD 103, as shown in FIG. 14. On a screen of the HUD 103, not only other cars located around the vehicle but also an obstacle (ob) located in an area hidden by the other car that the driver is unable to see may be displayed. That is, the vehicle may provide information about a hidden area that the driver is unable to see by providing even the sensor information collected from the other car for the driver. This may allow the driver to prevent from being involved in a problematic situation in advance.

Figure 15:
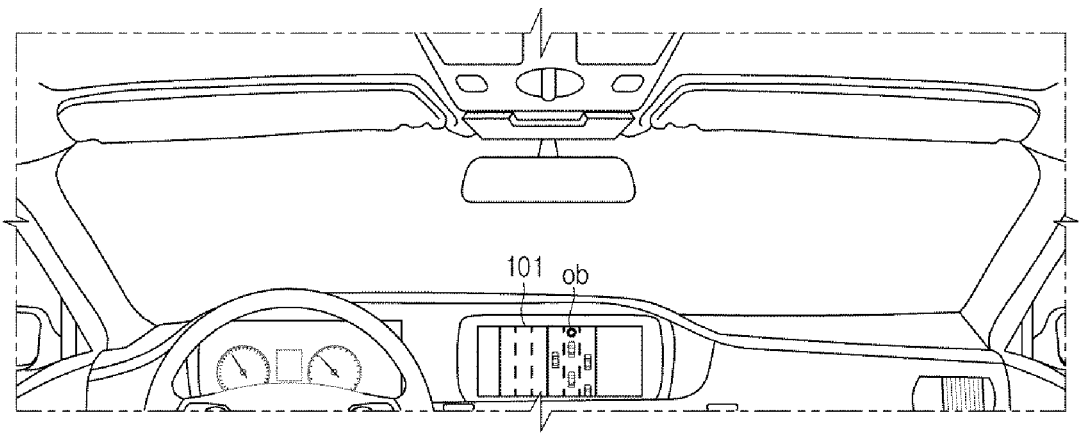
FIG. 15 illustrates a screen displaying surrounding condition information through an Audio Video and Navigation (AVN) display, according to embodiments of the present disclosure.

Alternatively, the vehicle may display the surrounding condition information through the AVN display 101, as shown in FIG. 15. Besides, the vehicle may provide the surrounding condition information through other various devices that are capable of providing visual information for the driver.

Figure 12:
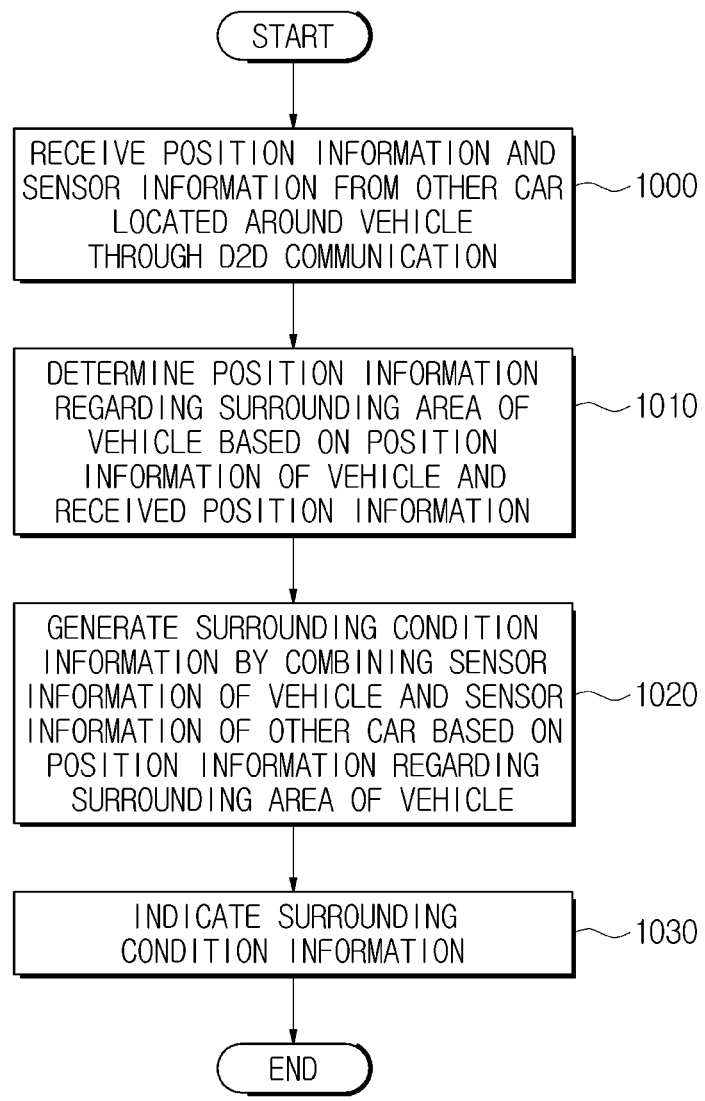
FIG. 12 is a flowchart illustrating operation of a vehicle for creating surrounding condition information based on position information and sensor information received from other cars located in the surrounding area of the vehicle through Device-to-Device (D2D) communication.

FIG. 12 is a flowchart illustrating operation of a vehicle for creating surrounding condition information based on sets of position information and sensor information received from other cars around the vehicle through Device-to-Device (D2D) communication.

The vehicle may exchange data with at least one other car located around the vehicle through D2D communication. For example, the vehicle may receive position information and sensor information from other car(s) located around the vehicle through D2D communication, in operation 1000. The position information includes, but not exclusively, information about a position of the other car measured by DGPS.

The vehicle may figure out a condition of the surrounding area of the vehicle by combining sets of position information of the other cars and position information of the vehicle. For example, while the vehicle is moving in the second lane on the road, which car is moving in which position in the first lane around the vehicle and which cars ahead and behind the vehicle are moving in the second lane may be figured out. Accordingly, the vehicle may generate surrounding condition information by combining the condition of the surrounding area of the vehicle that has been figured out by the vehicle with sensor information collected by the vehicle itself. The surrounding condition information may include information about positions of other cars located in the surrounding area of the vehicle and various information detected in the surrounding area of the vehicle.

The vehicle may indicate the surrounding condition information through a device in the vehicle. For example, the vehicle may display the surrounding condition information through the HUD 103, as shown in FIG. 14, and through the AVN display 101, as shown in FIG. 15. This will not be described because it was already described above.

Figure 13:
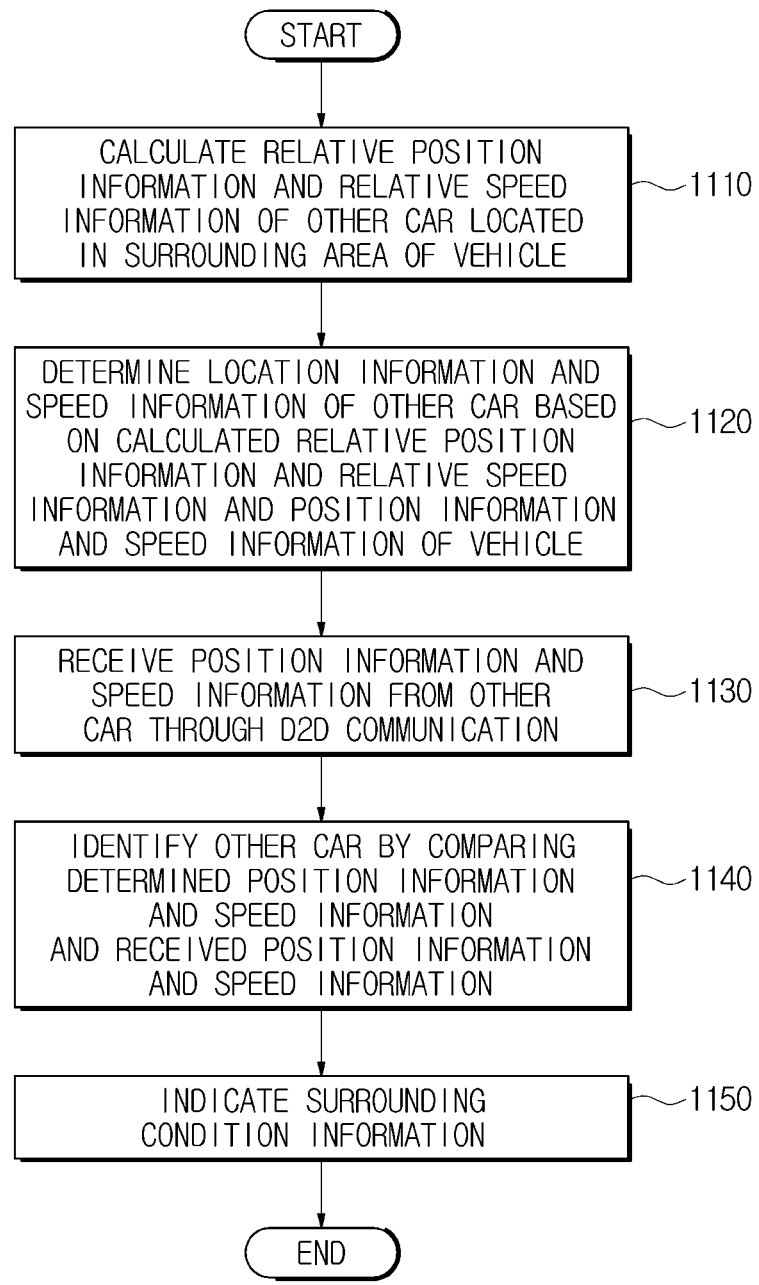
FIG. 13 is a flowchart illustrating operation of a vehicle, which uses relative position information and relative speed information of other cars located in the surrounding area of the vehicle to identify the other cars and create surrounding condition information based on the identification result, according to embodiments of the present disclosure.

FIG. 13 is a flowchart illustrating operation of a vehicle, which uses relative location information and relative speed information of other cars located in the surrounding area of the vehicle to identify the other cars, and creates surrounding condition information based on the identification result, according to embodiments of the present disclosure.

The vehicle may detect the presence of other cars located around the vehicle through at least one sensor. Accordingly, the vehicle may calculate relative position information and relative speed information of the other cars located around the vehicle through the sensor, in operation 1110.

For example, the vehicle may detect the presence of other cars through a camera. The vehicle may then detect positions of the other cars in an image or images captured by the camera to calculate relative positions of the other cars, and determine changes in positions of the other cars in the image to calculate relative speeds of the other cars.

The vehicle may determine position information of the other cars by comparing the relative position information of the other cars and the position information of the vehicle, and determine speed information of the other cars by comparing the relative speed information of the other cars and the speed information of the vehicle, in operation 1120.

The vehicle may receive position information and speed information from the other cars through D2D communication, in operation 1130. Accordingly, the vehicle may identify the other cars by comparing the position information and speed information calculated by the vehicle and the position information and speed information received from the other cars, in operation 1140. For example, the vehicle may compare the position information and speed information calculated by the vehicle and the position information and speed information received from the other cars to determine that the difference in the respective information falls within the margin of error if the difference is within a predetermined range. Accordingly, the vehicle may determine where the other cars are located in the surrounding area of the vehicle. The vehicle may then create surrounding condition information using the identification result, sensor information collected by the sensor of the vehicle, and sensor information received from the other cars.

After that, the vehicle may indicate the surrounding condition information through a device in the vehicle. For example, the vehicle may display the surrounding condition information through the HUD 103, as shown in FIG. 14, and through the AVN display 101, as shown in FIG. 15. This will not be described because it was already described above.

The method according to the embodiments of the present disclosure may be implemented in program instructions which are executable by various computing means and recorded in computer-readable media. The computer-readable media may include program instructions, data files, data structures, etc., separately or in combination. The program instructions recorded on the computer-readable media may be designed and configured specially for the present disclosure, or may be well-known to people having ordinary skill in the art of computer software. Examples of the computer readable recording medium include read-only memories (ROMs), random-access memories (RAMs), Compact Disc (CD)-ROMs, magnetic tapes, floppy disks, optical data storage devices, etc. The computer readable recording medium can also be distributed over network-coupled computer systems so that the computer readable code is stored and executed in a distributed fashion.

Examples of the program instructions include not only machine language codes but also high-level language codes which are executable by various computing means using an interpreter. The aforementioned hardware devices may be configured to operate as one or more software modules to carry out embodiments of the present disclosure, and vice versa.

Although the present disclosure is described with reference to some embodiments as described above and accompanying drawings, it will be apparent to those ordinary skilled in the art that various modifications and changes can be made to the embodiments. For example, the aforementioned method may be performed in different order, and/or the aforementioned systems, structures, devices, circuits, etc., may be combined in different combinations from what is described above, and/or replaced or substituted by other components or equivalents thereof, to obtain appropriate results. Therefore, other implementations, other embodiments, and equivalents thereof may fall within the following claims.

What is claimed is:

1. A vehicle comprising:
a wireless communication device transmitting a radio signal into a surrounding area of the vehicle through beamforming and receiving sensor information, in return, from at least one other vehicle that receives the radio signal;
a generator generating surrounding condition information regarding the surrounding area of the vehicle based on position information of the at least one other vehicle and the received sensor information;
an indicator indicating the surrounding condition information; and
an identifying unit identifying the at least one other vehicle based on position information and speed information calculated by a sensor unit of the vehicle and position information and speed information received through the wireless communication device from the at least one other vehicle, wherein
the wireless communication device transmits the radio signal into the surrounding area of the vehicle by dividing time intervals based on a gap set according to a beam width determined based on directional characteristics of the radio signal,
the generator is configured to generate the surrounding condition information based on the sensor information received from the at least one other vehicle identified by the identifying unit, and
wherein the generator is configured to generate position information regarding the surrounding area of the vehicle by comparing the position information of the vehicle measured by the position measuring device and the received position information of the at least one other vehicle and generate surrounding condition information by combining the sensor information of the vehicle and the sensor information of the at least one other vehicle with the position information regarding the surrounding area of the vehicle.

2. The vehicle of claim 1, wherein the wireless communication device transmits the radio signal based on a gap set according to the beam width.

3. The vehicle of claim 2, wherein the wireless communication device receives a response signal from the at least one other vehicle which has received the radio signal and is located in the surrounding area of the vehicle.

4. The vehicle of claim 3, wherein the generator determines a direction of transmitting a radio signal corresponding to the received response signal and determines the position information of the at least one other vehicle based on the determined transmission direction.

5. A vehicle comprising:
- a wireless communication device receiving position information and sensor information from at least one other vehicle located in a surrounding area of the vehicle through Device-to-Device (D2D) communication;
- a generator generating surrounding condition information regarding the surrounding area of the vehicle based on the received position information and sensor information by combining an identification of the at least one other vehicle and the received sensor information and generating sensor information of the vehicle;
- an indicator indicating the surrounding condition information;
- a position measuring device configured to measure position information of the vehicle; and
- an identifying unit identifying the at least one other vehicle based on position information and speed information calculated by a sensor unit of the vehicle and the position information and speed information received through the wireless communication device from the at least one other vehicle, wherein
- the wireless communication device transmits a radio signal into the surrounding area of the vehicle by dividing time intervals based on a gap set according to a beam width determined based on directional characteristics of the radio signal,
- the generator is configured to generate the surrounding condition information based on the sensor information received from the at least one other vehicle identified by the identifying unit, and
- wherein the generator is configured to determine position information regarding the surrounding area of the vehicle by comparing the position information of the vehicle measured by the position measuring device and the received position information of the at least one other vehicle and generate surrounding condition information by combining the sensor information of the vehicle and the sensor information of the at least one other vehicle with the position information regarding the surrounding area of the vehicle.

6. The vehicle of claim 5, further comprising:
- the sensor unit calculating the position information and the speed information of the at least one other vehicle located in the surrounding area of the vehicle.

7. The vehicle of claim 6, wherein the sensor unit measures relative position information and relative speed information of the at least one other vehicle located in the surrounding area of the vehicle, calculates position information of the at least one other vehicle based on the measured relative position information of the at least one other vehicle and position information of the vehicle, and calculates speed information of the at least one other vehicle based on the measured relative speed information of the at least one other vehicle and speed information of the vehicle.

8. The vehicle of claim 7, wherein the identifying unit identifies the at least one other vehicle by comparing the position information calculated by the sensor unit and the position information received through the wireless communication unit and by comparing the speed information calculated by the sensor unit and the speed information received through the wireless communication device.

9. A method for controlling a vehicle, the method comprising:
- transmitting, by a wireless communicator, a radio signal into a surrounding area of the vehicle through beamforming;
- receiving, by the wireless communicator, sensor information, in return, from at least one other vehicle that receives the radio signal;
- generating, by a generator, surrounding condition information regarding the surrounding area of the vehicle based on position information of the at least one other vehicle and the received sensor information;
- indicating, by an indicator, the surrounding condition information;
- identifying, by an identifying unit, the at least one other vehicle based on position information and speed information calculated by a sensor unit of the vehicle and position information and speed information received through the wireless communicator from the at least one other vehicle, wherein
- the transmitting of the radio signal comprises transmitting the radio signal into the surrounding area of the vehicle by dividing time intervals based on a gap set according to a beam width determined based on directional characteristics of the radio signal, and
- the generating of the surrounding condition information comprises generating the surrounding condition information based on the sensor information received from the at least one other vehicle identified by the identifying unit; and
- generating position information regarding the surrounding area of the vehicle by comparing the position information of the vehicle measured by the position measuring device and the received position information of the at least one other vehicle and generating surrounding condition information by combining the sensor information of the vehicle and the sensor information of the at least one other vehicle with the position information regarding the surrounding area of the vehicle.

10. The method of claim 9, wherein the transmitting of the radio signal comprises:
- transmitting the radio signal based on a gap set according to the beam width.

11. The method of claim 10, wherein the receiving of sensor information from the at least one other vehicle comprises:
- receiving a response signal from the at least one other vehicle which has received the radio signal and is located in the surrounding area of the vehicle.

12. The method of claim 11, wherein the generating of surrounding condition information comprises:
- determining a direction of transmitting a radio signal corresponding to the received response signal; and
- determining the position information of the at least one other vehicle based on the determined transmission direction.

* * * * *